United States Patent
Ryo

(10) Patent No.: US 12,248,827 B2
(45) Date of Patent: Mar. 11, 2025

(54) PRINTING APPARATUS PRINTING ONE OR MORE IMAGE SETS, CONTROL METHOD OF PRINTING APPARATUS, AND STORAGE MEDIUM

(71) Applicant: CANON KABUSHIKI KAISHA, Tokyo (JP)

(72) Inventor: Cho Ryo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/113,212

(22) Filed: Feb. 23, 2023

(65) Prior Publication Data
US 2023/0274115 A1  Aug. 31, 2023

(30) Foreign Application Priority Data
Feb. 25, 2022  (JP) .................. 2022-028265

(51) Int. Cl.
| | |
|---|---|
| G06F 15/00 | (2006.01) |
| B41J 11/70 | (2006.01) |
| B41J 15/16 | (2006.01) |
| G06K 15/00 | (2006.01) |
| G06K 15/02 | (2006.01) |
| H04N 1/00 | (2006.01) |
| B41J 3/407 | (2006.01) |
| B41J 29/48 | (2006.01) |

(52) U.S. Cl.
CPC ........... *G06K 15/1882* (2013.01); *B41J 11/70* (2013.01); *B41J 15/165* (2013.01); *G06K 15/022* (2013.01); *G06K 15/1823* (2013.01); *G06K 15/4065* (2013.01); *H04N 1/00676* (2013.01); *B41J 3/4075* (2013.01); *B41J 29/48* (2013.01); *G06K 15/024* (2013.01)

(58) Field of Classification Search
None
See application file for complete search history.

(56) References Cited

U.S. PATENT DOCUMENTS

| | | | |
|---|---|---|---|
| 5,905,520 A * | 5/1999 | Fujii | B65H 31/3054 347/153 |
| 8,243,304 B2 * | 8/2012 | Morales | G06F 3/1284 358/1.15 |
| 2017/0091603 A1 * | 3/2017 | Kikumoto | G06K 15/005 |
| 2018/0299814 A1 * | 10/2018 | Matsuo | G03G 15/652 |
| 2020/0081674 A1 * | 3/2020 | Fukami | G06F 3/1205 |
| 2021/0109685 A1 * | 4/2021 | Ishikawa | G06F 3/1219 |

FOREIGN PATENT DOCUMENTS

JP   2016-175197 A   10/2016

* cited by examiner

*Primary Examiner* — Mark R Milia
(74) *Attorney, Agent, or Firm* — VENABLE LLP

(57) ABSTRACT

A printing apparatus that prints images on a roll paper based on a job prints one or a plurality of image sets, each formed of a partition page image and a content image, on the roll paper based on a job in which partition information for inserting a partition page is set. In a case where the printing apparatus executes printing based on the job in which the partition information is set, control is performed to determine, based on a remaining amount of the roll paper loaded on the printing apparatus, a number of image sets that can be printed on the roll paper without interruption from among the image sets based on the job to print the determined number of image sets on the roll paper loaded on the printing apparatus.

19 Claims, 15 Drawing Sheets

FIG.3A

| JOB LIST | | | | | |
|---|---|---|---|---|---|
| DOCUMENT NAME | NUMBER OF PAGES | NUMBER OF COPIES | TYPE OF PAPER | NUMBER OF SCROLLS | DELETE |
| Document 1 | 900 | 1 | REGULAR PAPER | 3 | |
| Document 2 | 1000 | 1 | REGULAR PAPER | 4 | 302 |
| Document 3 | 5000 | 1 | REGULAR PAPER | 2 | |

301

PARTITION INFORMATION SETTING

303

OUTPUT HISTORY

305

PRINTED LENGTH    aaa m
PRINTABLE LENGTH  bbb m

304

PRINT

FIG.3B

| JOB LIST | | | | | |
|---|---|---|---|---|---|
| DOCUMENT NAME | NUMBER OF PAGES | NUMBER OF COPIES | TYPE OF PAPER | NUMBER OF SCROLLS | DELETE |
| Document 1 | 900 | 1 | | 3 | |
| Document 2 | 1000 | 1 | | 4 | 302 |
| Document 3 | 5000 | 1 | | 2 | |

301

PARTITION INFORMATION SETTING

303

OUTPUT HISTORY

305

PRINTED LENGTH    aaa m
PRINTABLE LENGTH  bbb m

304

PRINT

| JOB LIST | | | | | |
|---|---|---|---|---|---|
| DOCUMENT NAME | NUMBER OF PAGES | NUMBER OF COPIES | TYPE OF PAPER | NUMBER OF SCROLLS | DELETE |
| Document 2 | 1000 | 1 | REGULAR PAPER | 4 | |
| Document 3 | 5000 | 1 | REGULAR PAPER | 2 | |

| OUTPUT HISTORY | |
|---|---|
| Document 1 | 273.3m |

PARTITION INFORMATION SETTING

PRINTED LENGTH yyyy m
PRINTABLE LENGTH zzzz m

PRINT

FIG.3C

| JOB LIST | | | | | |
|---|---|---|---|---|---|
| DOCUMENT NAME | NUMBER OF PAGES | NUMBER OF COPIES | TYPE OF PAPER | NUMBER OF SCROLLS | DELETE |
| Document 1 | 900 | 1 | REGULAR PAPER | 3 | |
| Document 2 | 1000 | 1 | REGULAR PAPER | 4 | |
| Document 3 | 5000 | 1 | REGULAR PAPER | 2 | |

| OUTPUT HISTORY | |
|---|---|
| Document 1-1 | 91.1m |
| Document 1-2 | 91.1m |
| Document 2-1 | 76.25m |

PARTITION INFORMATION SETTING

PRINTED LENGTH xxxx m
PRINTABLE LENGTH xxxx m

PRINT

FIG.3D

PARTITION INFORMATION SETTING SCREEN

| DOCUMENT NAME | NUMBER OF PAGES | NUMBER OF COPIES | NUMBER OF SCROLLS |
|---|---|---|---|
| Document1 | 900 | 1 | 3 |

PARTITION FUNCTION: ON

PARTITION LENGTH: 1.0 m

| SCROLL NUMBER | PAGE NUMBER | |
|---|---|---|
| | START | END |
| 1 | 1 | 300 |
| 2 | 301 | 600 |
| 3 | 601 | 900 |

Save   Cancel

SCROLL 1:
- 1m — PAGE NUMBER: 1-300, SCROLL NUMBER: 1/3
- 1m — PAGE NUMBER: 1-300, SCROLL NUMBER: 1/3

SCROLL 2:
- 1m — PAGE NUMBER: 301-600, SCROLL NUMBER: 2/3
- 1m — PAGE NUMBER: 301-600, SCROLL NUMBER: 2/3

FIG.4B

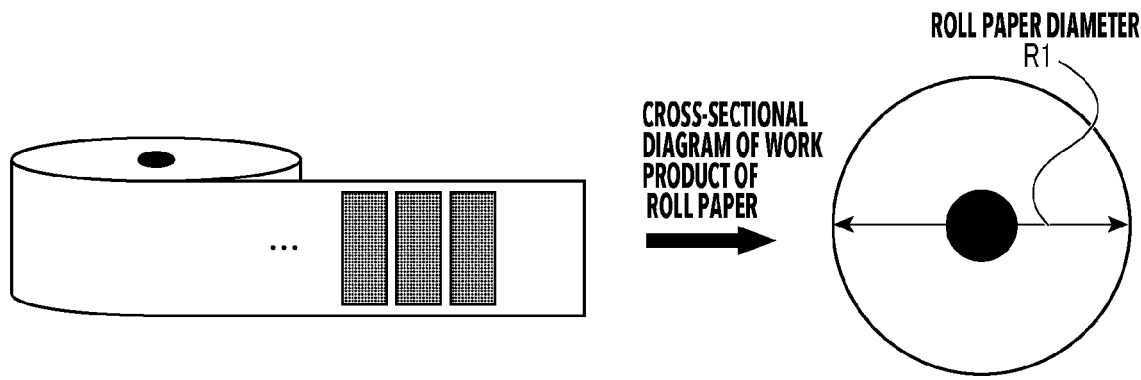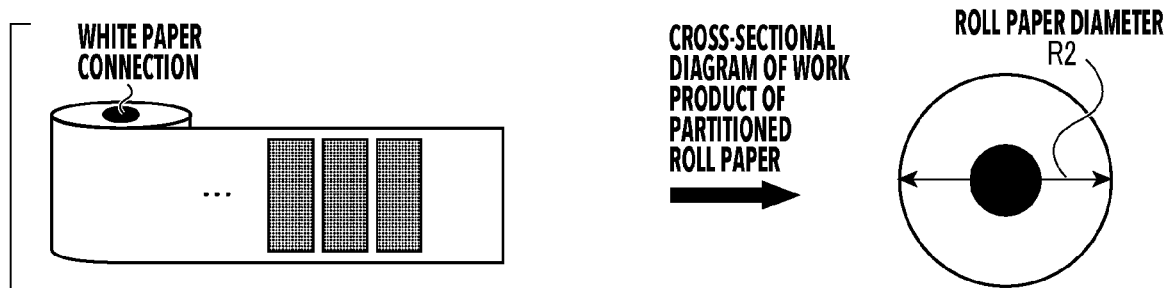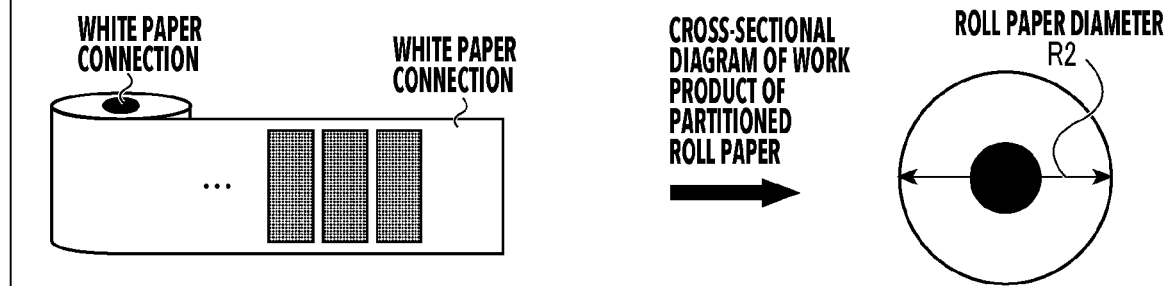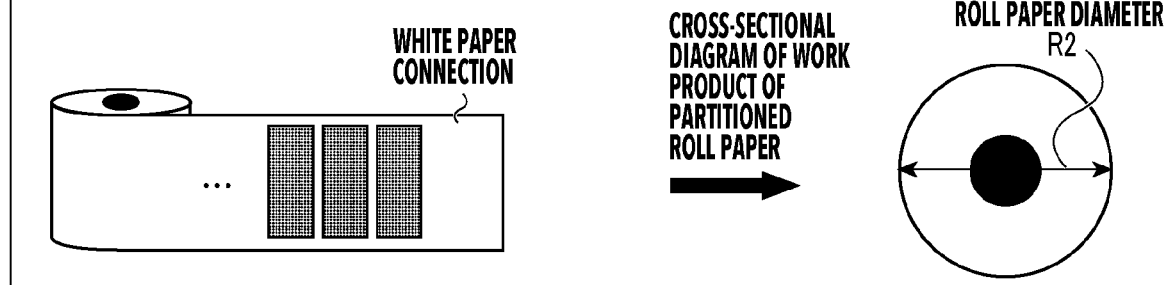
FIG.11

PRINTING APPARATUS PRINTING ONE OR MORE IMAGE SETS, CONTROL METHOD OF PRINTING APPARATUS, AND STORAGE MEDIUM

BACKGROUND

Field

The present disclosure relates to a technology of an image forming apparatus that forms images on a roll paper.

Description of the Related Art

In a label finisher system (for example, a post-processing machine capable of performing processes such as die cutting, stripping, and winding in one pass), specification limits such as the maximum winding diameter, the maximum weight, and the maximum length of a processable roll paper are required to be satisfied. Particularly, in the case of wounded finish of a label roll paper, an external size limit of a delivery roll is required to be satisfied such that the external size is within a size that can be fitted into an automatic label attaching machine (for example, a labeling machine).

In a label printing factory, there occurs work of partitioning a work product of the roll paper into multiple scrolls before delivery according to a delivery form such as the external size of the delivery roll or the number of scrolls to be delivered (quantity of the rolled scrolls to be delivered) specified by a customer user.

For example, assume a case where the work product of the roll paper on which images are formed is delivered as it is without the partition work of the work product as illustrated in part (a) of FIG. 11. In this case, since the diameter R1 of the roll paper or the weight of the roll paper does not satisfy the specification of the automatic label attaching machine, there is a risk that the work product cannot be set in the automatic label attaching machine. Accordingly, an operator needs to partition the work product of the roll paper into multiple scrolls according to the external size of the delivery roll or the number of delivery rolls specified by the customer user, at timing before the delivery. For example, the operator needs to partition the work product of part (a) of FIG. 11 on which the images are formed, into three scrolls such that the diameter of each roll paper is R2 as illustrated in part (b) of FIG. 11.

In the partition work, first, the print length of the work product of the roll paper or the number of labels is accurately measured to a requirement value indicating the external size limit of the delivery roll, and the work product of the roll paper is cut to segment a portion thereof. Then, white sheets with a predetermined length need to be connected to the segmented work product portion of the roll paper and a cut work product portion of the roll paper (roll paper from which the segmented work product portion is segmented) to allow these portions to be wound again around paper pipes. As described above, it is necessary to perform the partition work of the roll paper to match the paper roll to the requirements of the customer user such as the external size and the number of delivery rolls, and this partition work is very complex work.

As a patent literature relating to such label printing, Japanese Patent Laid-Open No. 2016-175197 discloses an image formation apparatus in which a user can specify the number of remaining labels to be printed after a new roll paper is loaded in replacement of the roll paper.

The case where multiple label images are printed based on one job and the printing is completed by using the loaded roll paper is discussed. In this case, first, in the work product of the roll paper, the print length or the number of labels is accurately measured to the requirement value indicating the external size limit of the delivery roll, and the work product of the roll paper is cut to allow segmentation of a portion thereof. Then, white sheets with a predetermined length are connected to the segmented work product portion of the roll paper and the cut work product portion of the roll paper to allow these portions to be wound again around paper pipes. The partition work to match the roll paper to the requirements of the customer is thereby performed.

SUMMARY

However, in the case where the remaining amount of the loaded roll paper is not enough and the roll paper needs to be replaced in the middle of printing based on one job, a problem may occur. For example, the case is discussed where the length of a work product 1 of the roll paper printed before the replacement and the length of a work product 2 of the roll paper printed after the replacement are uneven as illustrated in part (a) of FIG. 12, and the work products of the roll papers are partitioned into three scrolls as illustrated in part (b) of FIG. 12. In this case, two scrolls of a partitioned work product 1 of the roll paper with a diameter of R11 and a partitioned work product 2 of the roll paper with a diameter of R12 are assumed to be obtained by using the work product 1 of the roll paper with a diameter of R1. Moreover, a partitioned work product 3 (one scroll) of the roll paper with a diameter of R2 is assumed to be obtained by using the work product 2 of the roll paper with a diameter of R2.

In this case, although the diameter R11 of the partitioned work product 1 of the roller paper and the diameter R2 of the partitioned work product 3 of the roller paper are equal to or smaller than the maximum value of the external size of the delivery roll, the diameter R12 of the partitioned work product 2 of the roll paper may exceed the maximum value. Accordingly, the partitioned work product 2 of the roll paper cannot satisfy the requirements of the customer user. Although the partitioned work product 2 of the roll paper can be adjusted to satisfy the requirements of the customer user, the operator is required to perform further accurate partition work.

An object of the present disclosure is to perform printing such that partition work of an operator is reduced in the case where the printing is performed on a roll paper.

One embodiment of the present invention provides a printing apparatus that prints images on a roll paper based on one or a plurality of jobs, the printing apparatus including: an image forming unit that forms one or a plurality of image sets, each formed of a partition page image and a content image, on the roll paper based on a job in which partition information for inserting a partition page is set; and a control unit that controls image formation by the image forming unit, in which the control unit controls the image formation by the image forming unit based on a remaining amount of the roll paper such that there is no interruption in the middle of the image set, in a case where the printing apparatus executes printing based on the job in which the partition information is set.

Further features of the present invention will become apparent from the following description of exemplary embodiments with reference to the attached drawings.

BRIEF DESCRIPTION OF THE DRAWINGS

FIGS. 3A to 3D are diagrams illustrating a GUI screen for print setting;

FIGS. 4A to 4C are diagrams illustrating a GUI screen for partition information setting;

FIG. 11 is a diagram for explaining conventional partition work; and

DESCRIPTION OF THE EMBODIMENTS

Preferable embodiments of the present disclosure are described below in detail with reference to the attached drawings. Note that the embodiments described below do not unnecessarily limit the invention according to the scope of claims, and not all combinations of features described below are necessarily essential for solving means of the present disclosure.

First Embodiment

A first embodiment is described below.

Regarding Image Forming System

Figure 1:
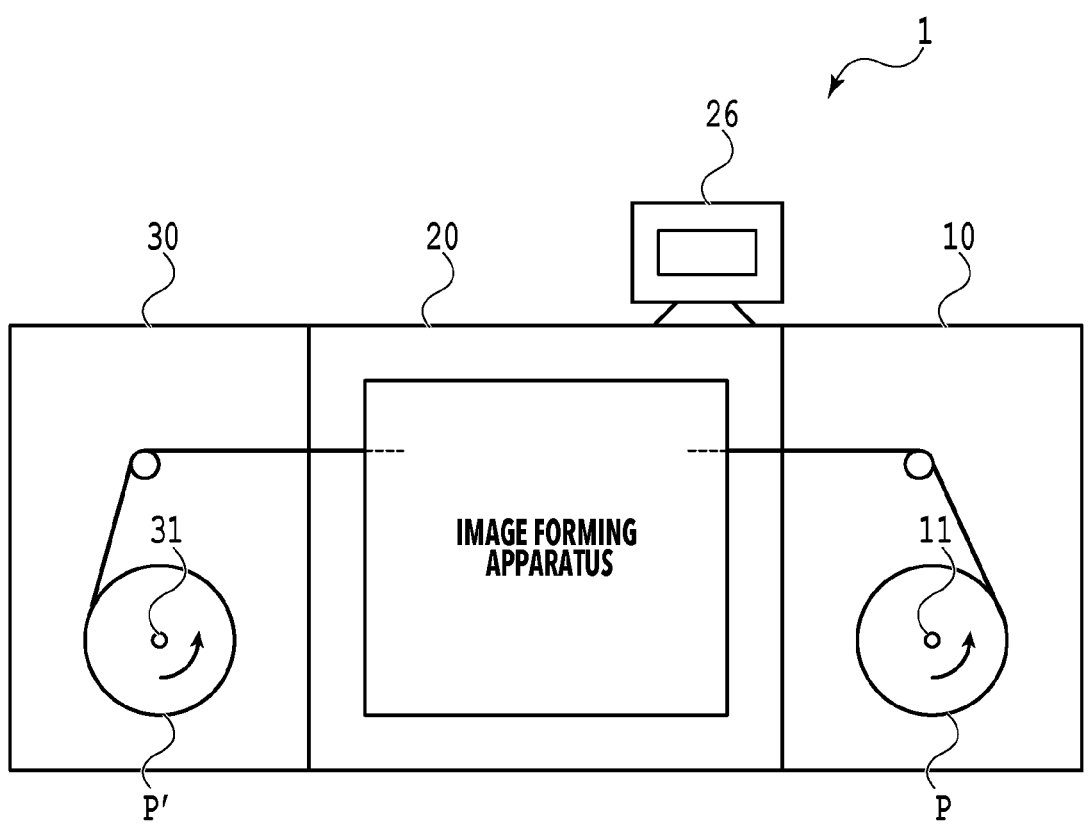
FIG. 1 is a diagram illustrating a schematic configuration of an image forming system.

First, a configuration of an image forming system in the present embodiment is described. FIG. 1 illustrates an example of a schematic configuration of the image forming system according to the present embodiment. As illustrated in FIG. 1, the image forming system 1 is a system that forms images on a roll paper (also referred to as continuous paper) P that is a recording medium on which continuous image formation is possible. The image forming system 1 is formed by connecting a paper feeding apparatus 10, an image forming apparatus 20, and a winding apparatus 30 to one another in this order from the upstream side in a conveyance direction of the roll paper P. The image forming system is assumed to be a printing apparatus, a multi-function peripheral, or the like.

The paper feeding apparatus 10 is an apparatus that feeds the roll paper P to the image forming apparatus 20. The paper feeding apparatus 10 rotates a paper pipe of the roll paper P about a rotational shaft 11, and conveys the roll paper P wound around the paper pipe toward the image forming apparatus 20 at predetermined speed, via multiple rollers (for example, a conveyance roller, a paper feed roller, and the like).

The image forming apparatus 20 forms images on the roll paper P fed from the paper feeding apparatus 10, and conveys the roll paper P on which the images are formed, toward the winding apparatus 30. Note that an operation display unit 26 that is operated by a user and that displays information to the user is connected to the image forming apparatus 20. The operation display unit 26 is described later (see FIG. 2).

The winding apparatus 30 is an apparatus that winds the roll paper P conveyed from the image forming apparatus 20 about a paper pipe into a roll shape. In the winding apparatus 30, for example, as illustrated in FIG. 1, the roll paper P is wound around the paper pipe of a rotational shaft 31 to be held in a roll shape. Specifically, the roll paper P conveyed to the paper pipe by rotating the roll paper P about the rotational shaft 31 is wound on the rotational shaft 31 at predetermined speed as a work product P' of the roll paper, via multiple rollers (for example, a conveyance roller and a discharge roller).

Figure 2:
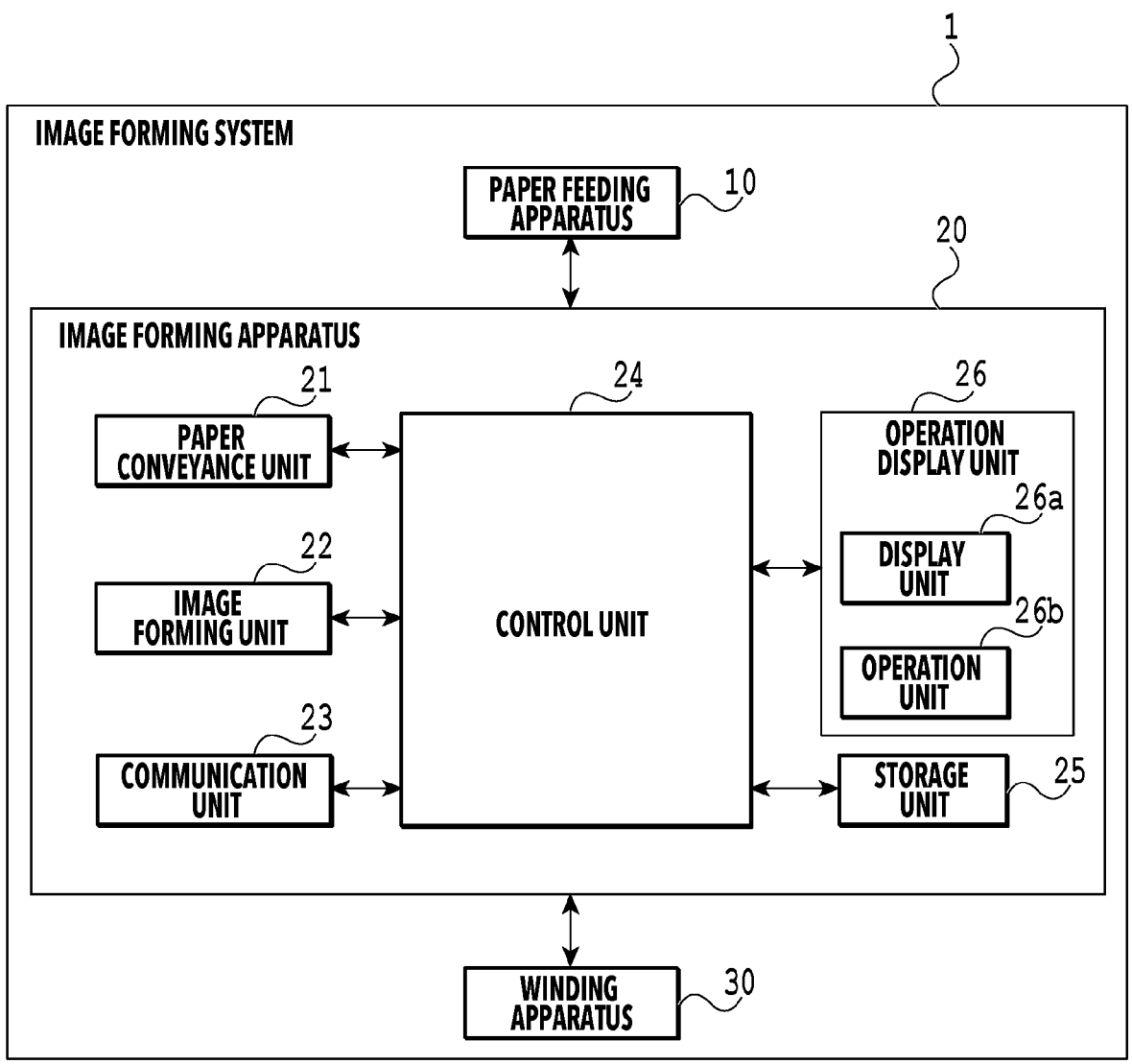
FIG. 2 is a block diagram of an image forming system.

Next, configurations relating to the image formation in the image forming system 1 are described in detail. FIG. 2 is a block diagram of the image forming system 1. In FIG. 2, the paper feeding apparatus 10 and the winding apparatus 30 are treated as external apparatuses of the image forming apparatus 20.

As illustrated in FIG. 2, the image forming apparatus 20 includes a paper conveyance unit 21, an image forming unit 22, a communication unit 23, a control unit 24, a storage unit 25, and the operation display unit 26. Note that the image forming apparatus 20 may include components other than those described above.

The paper conveyance unit 21 is a conveyance mechanism of the roll paper P that is arranged inside the image forming apparatus 20. For example, the paper conveyance unit 21 is formed of multiple rollers, and uses these multiple rollers to convey the roll paper P conveyed from the paper feeding apparatus 10 to the image forming unit 22 and convey the roll paper P having passed the image forming unit 22 to the winding apparatus 30.

The image forming unit 22 forms images on the roll paper P fed from the paper feeding apparatus 10, based on print data for which the image forming unit 22 has received an output instruction. The roll paper P on which the images are formed by the image forming unit 22 is conveyed toward the winding apparatus 30 by the paper conveyance unit 21 and the image forming unit 22.

The communication unit 23 is formed of a communication control card such as, for example, a local area network (LAN) card. The communication unit 23 exchanges various pieces of data with an external apparatus (information processing apparatus such as, for example, PC) connected to a communication network such as a LAN or a wide area network (WAN).

The control unit 24 is formed of, for example, a central processing unit (CPU), a random access memory (RAM), and the like. The CPU of the control unit 24 reads out various programs such as a system program and a processing program stored in the storage unit 25, and loads the programs onto the RAM to execute various processes according to the loaded programs. For example, the control unit 24 can perform an image forming process of executing an image formation job (hereinafter, referred to as job) in response to an instruction of the user.

The storage unit 25 is formed of, for example, a nonvolatile semiconductor memory (so-called flash memory), a hard disk drive (HDD), and the like. In the storage unit 25, there are stored various programs including the system program and the processing program to be executed in the control unit 24 and various pieces of data necessary to execute these programs.

The operation display unit 26 is formed of, for example, a liquid crystal display (abbreviated as LCD) with a touch panel, and includes a display unit 26a and an operation unit 26b. The display unit 26a displays various pieces of information on the LCD according to a display control signal received from the control unit 24. The operation unit 26b includes various operation keys such as numerical keys and a start key, receives various input operations made by the user, and outputs operation signals based on operation contents of the user to the control unit 24. For example, the operation display unit 26 is used in, for example, the case where the user sets partition information before execution of a job.

The "partition information" is explained. The partition information is information set in advance by the user or an operator to, for example, partition the roll paper P' subjected to the image forming process into multiple scrolls. In detail, the partition information is information that is actually printed in a page intentionally inserted to clarify end portions (leading end, trailing end) in one scroll. Note that, in the present description, since such a page function as a partition region between a scroll and another scroll printed continuously, this page is defined as "partition information page (or partition page)", and information indicating a position where the partition information page is to be inserted is defined as "partition information page insertion position information". A group of all images forming one scroll in the present embodiment, that is content images (for example, label images) actually necessary in subsequent operations and a page image of the partition information page for the operator performing a cutting operation are defined together as an "image set" of the scroll.

Information such as page numbers in the scroll, the length of the scroll, the length of a region that functions as a partition (hereinafter, referred to as partition length), a scroll number, and the like can be used as the partition information. For example, in part (a) of FIG. 10, "page number: 601 to 900", "scroll number: 3/3", and the like are printed as the partition information in the partition information page. Moreover, the insertion position information is generated by using the number of pages to be printed, the number of labels to be printed, the length of printing, and the like as partition conditions.

Next, operations performed in the case where the image forming process is performed on the roll paper P in the image forming apparatus 20 are described.

First, the user creates a job including image data to be printed by using an external apparatus (for example, PC) of the image forming system 1, and performs print setting and setting of the number of scrolls to be delivered corresponding to the created job. Then, the user transmits the job as well as print setting information and information on the setting of the number of scrolls to be delivered corresponding to the job to the image forming apparatus 20 via the communication network, by using the external apparatus. Note that the print setting and the setting of the number of scrolls to be delivered may be performed through a GUI screen displayed on the display unit 26a, instead of using the external apparatus.

The control unit 24 of the image forming apparatus 20 receives data of the job sent from the external apparatus via the communication unit 23 and a job ticket including the print setting information, the information on the setting of the number of scrolls to be delivered, and the like corresponding to the job. Although the image data to be printed is assumed to be included in the job and the print setting information and the information on the setting of the number of scrolls to be delivered are assumed to be included in the job ticket in the present embodiment, a data configuration relating to the job is not limited to this. For example, the job may include the print setting information and the information on the setting of the number of scrolls to be delivered in addition to the image data.

Regarding Job List That is GUI Screen for Print Setting

FIGS. 3A and 3D are each a diagram illustrating a pattern of a job list that is implemented by the control unit 24 and the display unit 26a and that is a GUI screen for the print setting.

As illustrated in FIG. 3A, pieces of information (referred to as job information) on submitted jobs are displayed in a display region 301 as a list in the order of submission of the jobs. In the present embodiment, the job information displayed in the display region 301 includes information on items such as a document name, the number of pages, the number of copies, a type of paper, and the number of scrolls. Note that information other than that described above may be displayed in the display region 301.

The job information includes the document name, the number of pages, a page size, the number of copies, the type of paper, the number of scrolls to be delivered, layout information of blank labels (blank label horizontal width, intervals between blank labels, and the like), and the like. The user can select one or multiple jobs from the jobs displayed as a list in the display region 301 by operating the operation keys of the operation unit 26b.

A displayed item 302 is a button for deleting a job selected in the display region 301. In the case where the user presses the displayed item 302, the selected job and the job information associated with the selected job are deleted from the storage unit 25.

A displayed item 303 is a button for setting the partition information. The user can cause a screen for setting the partition information for a job selected in the display region 301 to be displayed by pressing the displayed item 303.

A displayed item 304 is a button for starting printing (image formation) of a job selected in the display region 301.

A list of output history of jobs for which images have been formed on the currently-loaded roll paper is displayed in a display region 305. Moreover, values of a printed length and a printable length are also displayed in the display region 305 as information on the lengths for the currently-loaded roll paper. For example, in FIG. 3C, "yyyy m" is displayed as the value of the printed length, and "zzzz m" is displayed as the value of the printable length. In the case where the roll paper is replaced with a new roll paper, the information on the output history and the information on the lengths of the roll paper for the roll paper that have been loaded until now (these pieces of information are stored in the storage unit 25) are updated to the information on the output history and the information on the lengths of the roll paper for the new roll paper. As a result, display contents in the display region 305 are updated. In this case, since there is no job for which images have been formed on the new roll paper, the information on the output history is not displayed in the display region 305. Moreover, "0 m" is displayed as the value of the printed length.

Figure 4A:
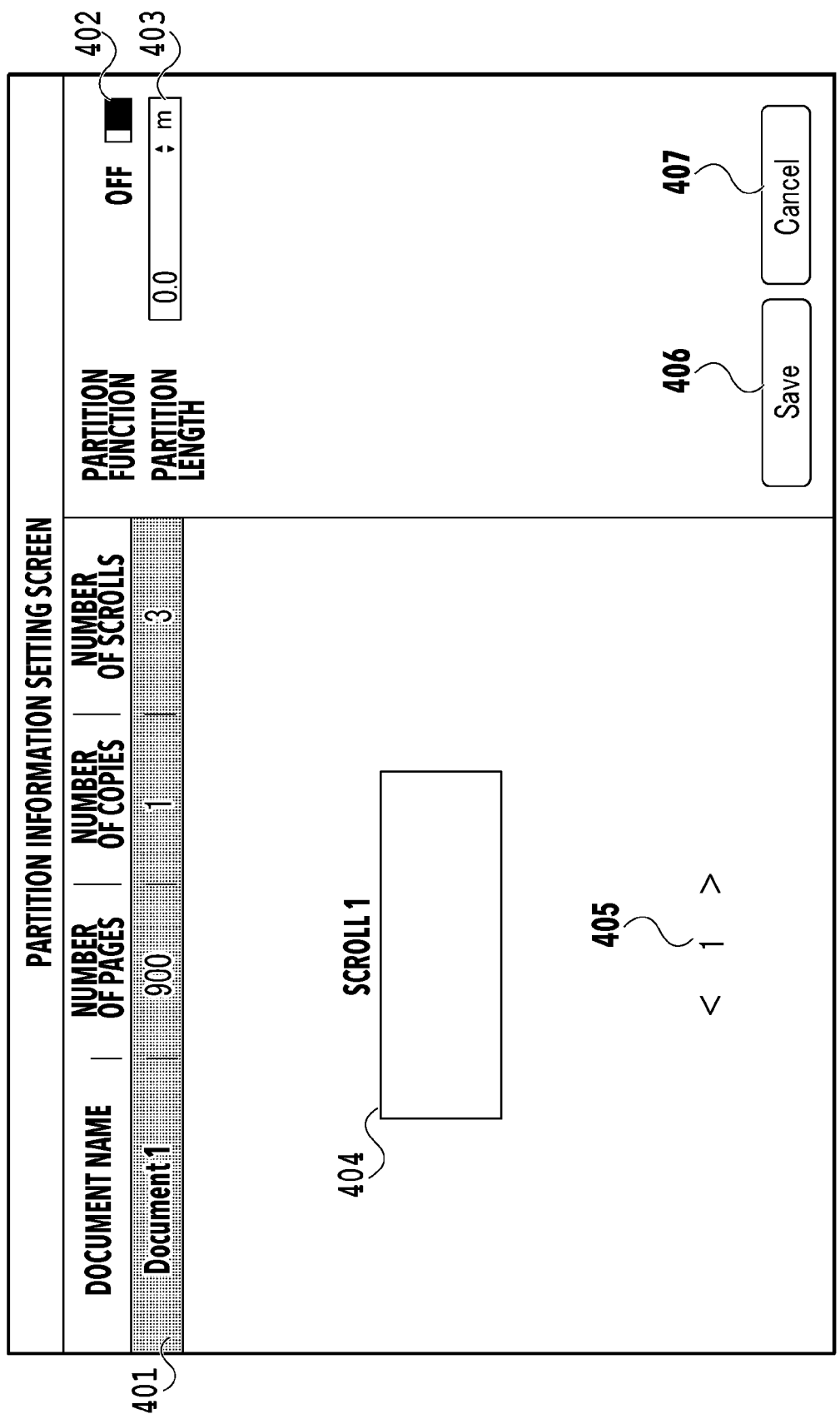
Figure 4C:
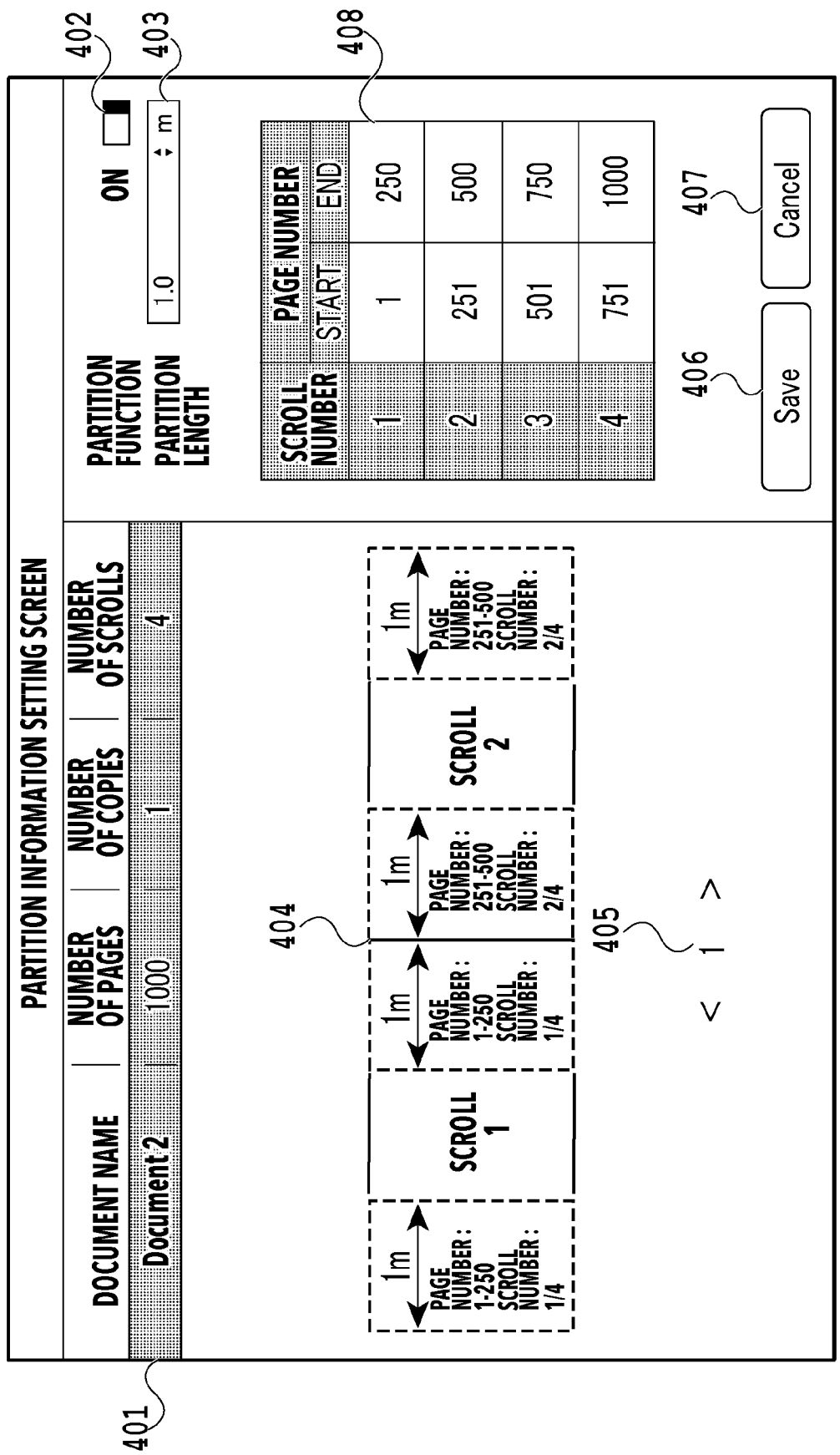

FIGS. 4A to 4C are each a diagram illustrating a pattern of a GUI screen in which the user sets the partition information and that is implemented and provided by the control unit 24 and the display unit 26a in the case where the displayed item 303 in FIGS. 3A to 3D is pressed. Note that the GUI screens as illustrated in FIGS. 4A to 4C are hereinafter referred to as "partition information setting screen".

FIG. 4A is an example of the partition information setting screen in the case where a partition information setting function is in an off state. The GUI screen illustrated in FIG. 4A is displayed in default. As illustrated in FIG. 4A, the job information of the selected job is displayed in a display region 401.

A displayed item 402 is a toggle switch for switching between setting or not setting the partition information for the selected job, that is switching between on and off of the partition information setting function (hereinafter, referred to as "partition function"). Note that, since the partition function is in the off state in the example of FIG. 4A, an output product of one scroll is obtained instead of multiple scrolls in the case where the printing is executed as it is.

A displayed item 403 is an input field of a numerical value for setting the length of the partition region (partition length), and a spin button is added thereto. The user can set the partition length through the displayed item 403. Specifically, the user can directly input a numerical value in the displayed item 403 by operating the operation keys of the operation unit 26b, or adjust a numerical value by pressing the spin button. Note that a default value of the partition length is 0.0 m as illustrated in FIG. 4A. In the case where the printing is executed with the partition length set to 0.0 m, no image data of the partition information page is generated and, as a result, the partition region between a scroll and another scroll is not provided in the outputted product.

A displayed item 404 is a preview of an output product that would be obtained if the printing was executed based on the currently-set partition information. Note that, since the partition function is in the off state in FIG. 4A, no partition page is displayed in the preview. Meanwhile, since the partition function is in the on state in FIGS. 4B and 4C, the partition page is displayed in the preview.

A displayed item 405 is used to change a page displayed in the preview.

A displayed item 406 is a button for temporarily storing the partition information set by the user or the operator. In the case where the displayed item 406 is pressed, the set partition information and the image data of the partition information page based on the set partition information are stored in the storage unit 25.

A displayed item 407 is a button for canceling the setting of the partition information by the user. In the case where the displayed item 407 is pressed, the set partition information and the image data of the partition information page based on the set partition information are deleted from the storage unit 25.

Regarding Image Forming Process Performed on Roll Paper

Figure 5:
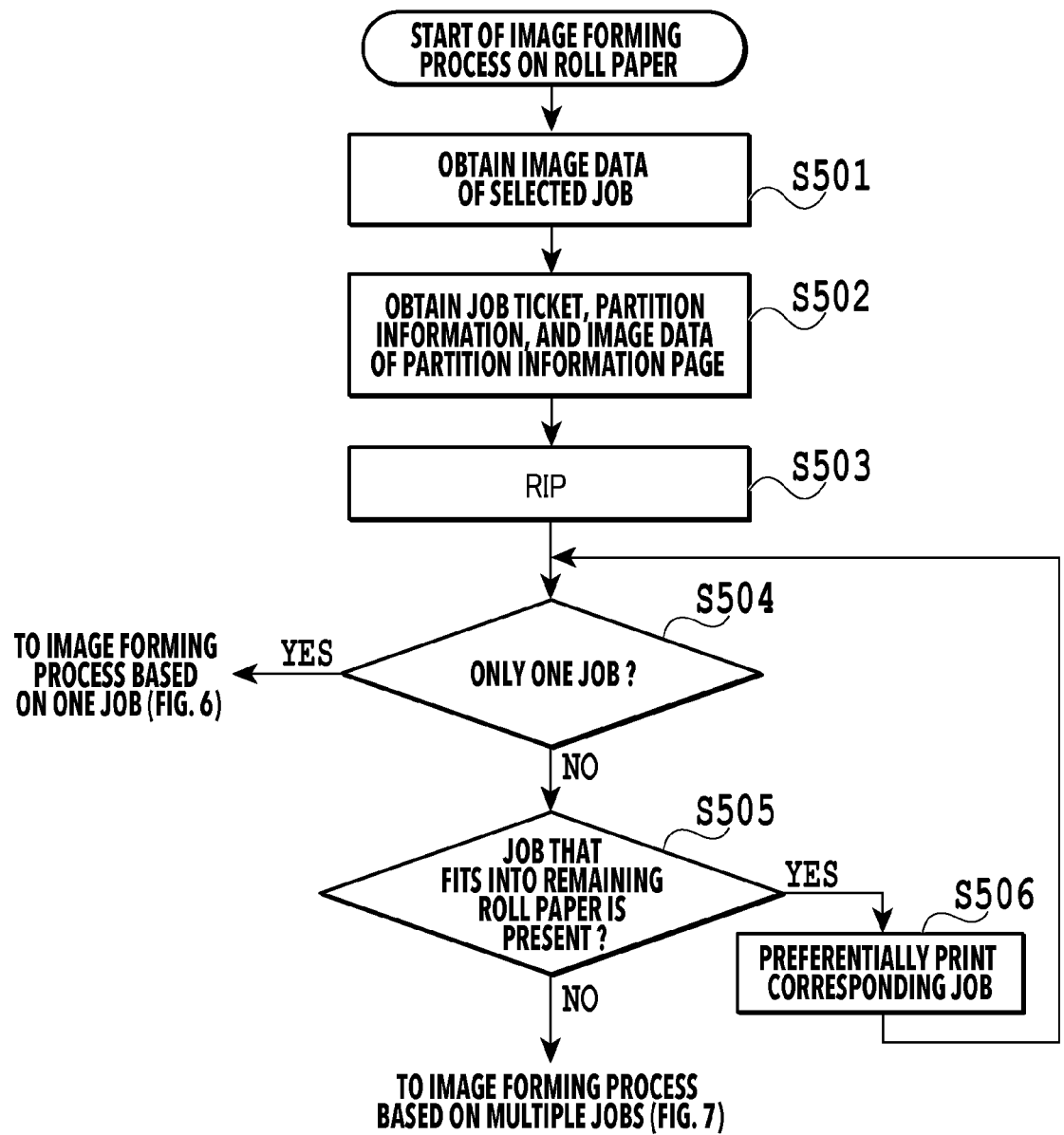
FIG. 5 is a flowchart of an image forming process performed on a roll paper.

FIG. 5 is a flowchart of the image forming process performed on the roll paper P. The CPU of the control unit 24 executes processes of the respective steps in the series of processes illustrated in FIG. 5. Specifically, the CPU of the control unit 24 loads the system program stored in the storage unit 25 onto the RAM of the control unit 24, and executes the loaded system program to function as an execution entity that executes the processes of the respective step. Note that the processes of FIG. 5 are started in the case where the user selects a job through the display region 301 and presses the displayed item 304 as illustrated in FIG. 3A.

First, in step S501, the CPU of the control unit 24 obtains the image data of the job selected by the user. Note that, in the following description, "step S . . . " is abbreviated as "S . . . ".

In S502, the CPU of the control unit 24 obtains the job ticket corresponding to the job selected by the user. Moreover, the CPU of the control unit 24 obtains the partition information corresponding to the job selected by the user and set by the user and the image data of the partition information page based on the obtained partition information.

In S503, the CPU of the control unit 24 executes a RIP process on the image data of the job obtained in S501, and generates image data of a bit-map format for forming images In S504, the CPU of the control unit 24 determines whether only one job is selected through the display region 301. In the case where the result of the determination in the present step is true, the CPU proceeds to an image forming process based on one job (see FIG. 6). In the case where the result of the determination in the present step is false, the CPU proceeds to S505.

In S505, the CPU of the control unit 24 performs determination for multiple jobs selected by the user. In detail, the CPU of the control unit 24 determines whether the multiple jobs selected by the user includes a job whose length fits within a currently-loaded roll paper. Specifically, the CPU determines whether the multiple jobs selected by the user includes such a job that the roll length necessary for printing of the job is equal to or smaller than the printable length of the currently-loaded roll paper, among. In the case where the result of the determination of the present step is true, the CPU proceeds to S506. Meanwhile, in the case where the result of the determination of the present step is false, the CPU proceeds to an image forming process based on multiple jobs (see FIG. 7).

For example, the case is discussed where the length of one page is 297.0 mm and the partition information is set for a job that is selected through the display region 301 and that has a document name of Document 1 as illustrated in FIG. 4C. Assume that the length necessary for printing in this case is calculated to be (1 m+297.0 mm×300+1 m)×3=273.3 m according to the formula (1). Moreover, assume that the partition information is similarly set for a job that is selected through the display region 301 and that has a document name of Document 2 as illustrated in FIG. 4C, and the roll length necessary for printing is calculated to be 305.5 m.

Roll length necessary for printing of job=(partition length+length of one page×number of pages+ partition length)×number of scrolls    formula (1)

Specifically, for Document 1, the print length from page 1 to page 300 for the first scroll is 89.1 m. Similarly, the print length from page 301 to page 600 for the second scroll is 89.1 m, and the print length from page 601 to page 900 for the third scroll is 89.1 m. Since partition information pages of 1 m are set in front of and behind each scroll, the roll length necessary for the printing of the job is (1.0 m+89.1 m+1.0 m)×3=273.3 m.

The case where the determination process of S505 is executed in the state where Document 1 (roll length necessary for printing is 273.3 m) and Document 2 (roll length necessary for printing is 305.5 m) are selected by the user is discussed.

In this case, if the printable length of the currently-loaded roll paper is 300.0 m, the roll length necessary for printing of Document 1 is equal to or smaller than the printable length of the currently-loaded roll paper (273.3 m≤300.0 m).

Accordingly, the multiple jobs (Document 1, Document 2) include a job (Document 1) in which the roll length necessary for the printing is equal to or smaller than the printable length of the currently-loaded roll paper. Thus, the result of the determination is YES in S505, and the CPU proceeds to S506.

Meanwhile, in the case where the printable length of the currently-loaded roll paper is 260.0 m, the multiple jobs (Document 1, Document 2) include no job in which the roll length necessary for the printing is equal to or smaller than the printable length of the currently-loaded roll paper. Accordingly, the result of the determination is NO in S505, and the CPU proceeds to S701 (see FIG. 7). Processes of S701 and beyond are described in a second embodiment.

In S506, the CPU of the control unit 24 executes printing, specifically, forms images based on the image data of the job on the roll paper P by cooperating with the image forming unit 22. In the present step, the job in which the roll length necessary for printing is equal to or smaller than the printable length of the currently-loaded roll paper is preferentially printed.

For example, in the case where the printing is executed in the state where Document 1 and Document 2 described above are selected (see FIG. 3B) and the printable length of the currently-loaded roll paper is 300.0 m, Document 1 is printed before Document 2. After completion of the printing of Document 1, the output history is updated in the display region 305 as illustrated in FIG. 3C. After S506, the CPU proceeds to S504 and executes the image forming process for the remaining job (Document 2).

Regarding Image Forming Process Based on One Job

Figure 6:
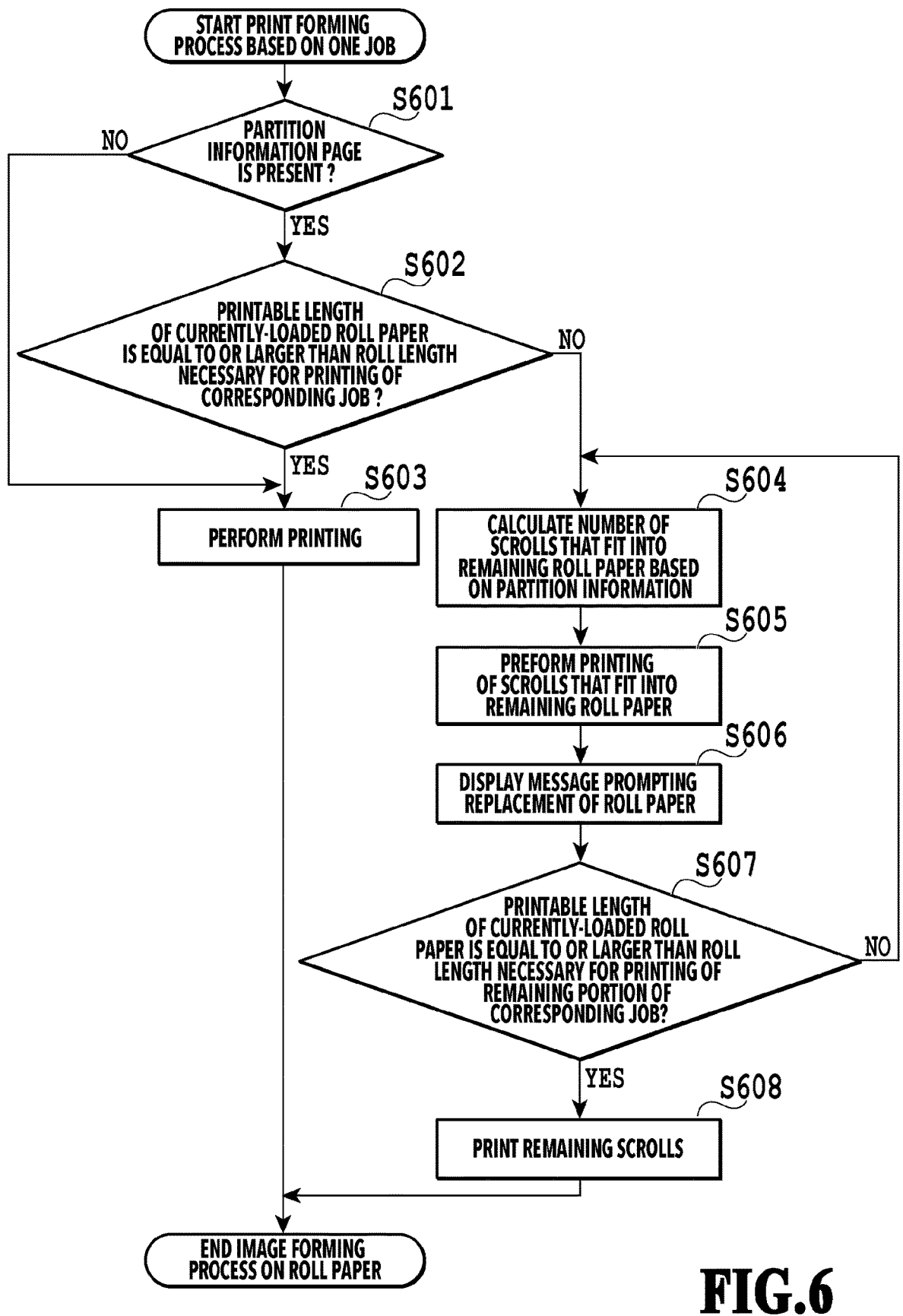
FIG. 6 is a flowchart of the image forming process based on one job in a first embodiment.

FIG. 6 is a flowchart of the image forming process based on one job that is executed in the case where the result of the determination is YES in S504 (see FIG. 5). The CPU of the control unit 24 executes processes of the respective steps in the series of processes illustrated in FIG. 6. Specifically, the CPU of the control unit 24 loads the system program stored in the storage unit 25 onto the RAM of the control unit 24, and executes the loaded system program to function as an execution entity that executes the processes of the respective steps.

In S601, the CPU of the control unit 24 determines whether the partition information page for the corresponding job is present by using setting information of "present/absent" indicating whether the partition information page is present or absent. In the case where the result of the determination of the present step is true, the CPU proceeds to S602. Meanwhile, in the case where the result of the determination of the present step is false, the CPU proceeds to S603. For example, the setting value of the partition length can be used as the setting information of "present/absent" indicating whether the partition information page is present or absent.

For example, in the case where the partition length is set to 0.0 m as illustrated in FIG. 4A, the CPU determines that the partition information page is absent in the present step, and proceeds to S603. Meanwhile, for example, in the case where the partition length is set to 1.0 m as illustrated in FIG. 4B, the CPU determines that the partition information page is present in the present step, and proceeds to S602.

In S602, the CPU of the control unit 24 determines whether the printable length of the currently-loaded roll paper is equal to or larger than the roll length necessary for the printing of the corresponding job. In the case where the result of the determination of the present step is true, the CPU proceeds to S603. Meanwhile, in the case where the result of the determination of the present step is false, the CPU proceeds to S604.

For example, in the case where the printable length of the currently-loaded roll paper is 300.0 m and the roll length necessary for the printing of the corresponding job is 273.3 m, the result of the determination of the present step is true, and the CPU proceeds to S603. Meanwhile, in the case where the printable length of the currently-loaded roll paper is 250.0 m and the roll length necessary for the printing of the corresponding job is 273.3 m, the result of the determination of the present step is false, and the CPU proceeds to S604.

Figure 8:
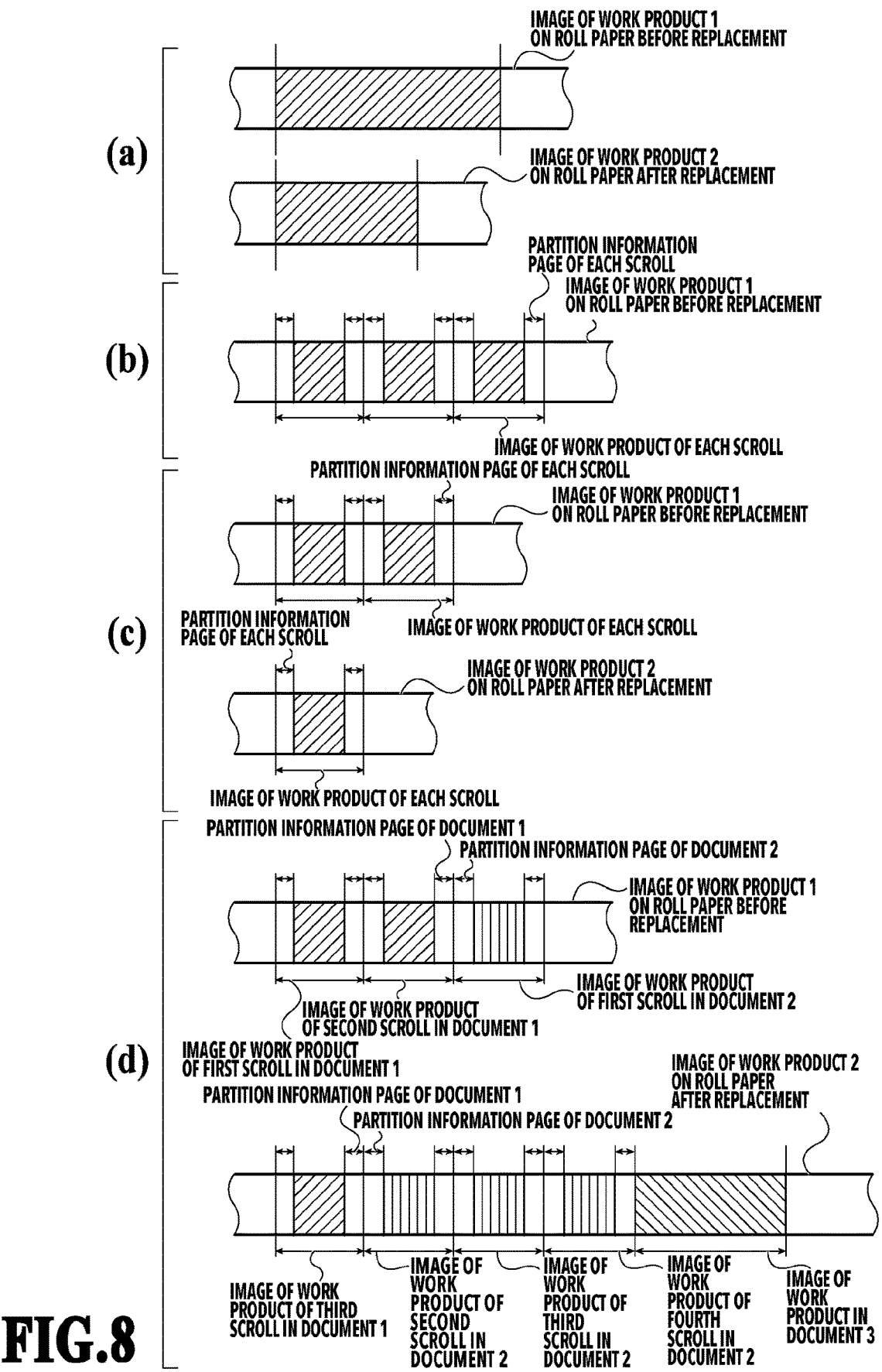
FIG. 8 is an image diagram of a work product.

In S603, the CPU of the control unit 24 executes the printing process of the corresponding job by cooperating with the image forming unit 22. Specifically, the CPU forms images based on the image data of the corresponding job on the roll paper P. For example, a work product as illustrated in part (b) of FIG. 8 is obtained in the printing process of the present step. After S603, the series of processes is terminated.

The case where the roll length necessary for the printing of the corresponding job does not fit into the printable length of the currently-loaded roll paper (NO in S602) is discussed. In this case, in the present embodiment, the CPU of the control unit 24 performs the image formation within a range that fits into the printable length of the currently-loaded roll paper. Subsequently, the roll paper is replaced with a new roll paper, and then the CPU resumes the image formation of the corresponding job. According to the present embodiment, for example, the work product illustrated in part (a) of FIG. 8 is obtained in the case where the partition function is off Next, the case where the partition function is on is discussed. FIG. 4B illustrates an example of the partition information setting screen in the case where the partition function is in the on state and the partition length is set to 1.0 m.

In detail, the displayed item 402 (toggle switch) is in the on state and "three scrolls" is set as the number of scrolls of the job. Accordingly, an image illustrating a print result of the job partitioned into three scrolls is displayed by using the displayed item 404 (preview). However, in FIG. 4B, only the rolls up to the second scroll are displayed, and the third scroll is not displayed due to size limitation of an arrangement region of the preview. Accordingly, the user needs to switch display contents by using the displayed item 405 in the case of viewing the third scroll.

The user can specify a start page and an end page of each scroll by using a displayed item 408 (text box). The information such as the maximum number of pages settable for each scroll is calculated by using a limit value expressing a specification limit of a label finisher system used after the printing or a delivery requirement (specification limit of an automatic label attaching machine or the like) of the customer user. For example, the case where the value expressing the specification limit of the label finisher system is 100.0 m and the length of one page is 297 mm is discussed. In this case, 100.0×100÷29.7=336.7 . . . , and the maximum number of pages settable (capable of being inputted) for each scroll is 336 pages.

Note that the information on a final work product as described above (referred to as delivery information) can be manually set by the operator through a displayed item such as the displayed item 408 (text box). Moreover, the image forming system can receive the delivery information such as the diameter (maximum value) of the scroll in a delivery form, the specification limit of the label finisher system, and the like via the communication unit 23, and automatically set the information on the final work product based on the received delivery information.

FIG. 4B illustrates the case where the aforementioned maximum number of pages is 336 pages. As illustrated in the displayed item 408, the first scroll is from page 1 to page 300. The second scroll is from page 301 to page 600, and the third scroll is from page 601 to page 900. In the case where the printing is executed in the state illustrated in FIG. 4B, for example, the work product illustrated in part (c) of FIG. 8 is obtained.

Returning to the description of FIG. 6, in S604, the CPU of the control unit 24 calculates the number (denoted by N) of rolled scrolls in the delivery form that fit into the printable length of the currently-loaded roll paper, based on the partition information, according to the formula (2).

Number N of rolled scrolls in delivery form=[printable length L of currently-loaded roll paper/roll length necessary for printing of each scroll]    formula (2)

For example, the case is discussed where the printable length of the currently-loaded roll paper is 200 m and the roll length necessary for printing of each scroll calculated based on the partition information is 91.1(=1.0+89.1+1.0) m described above. In this case, the number N of rolled scrolls in the delivery form is calculated to be [200 m/91.1 m]=2.

In S605, the CPU of the control unit 24 executes the print process of the corresponding job by cooperating with the image forming unit 22. In the printing of each scroll in the present step, the printing is performed from the start page to the end page of each scroll included in the partition information, and the partition information page is added and printed in each of the start page and the end page. Moreover, in the present step, images based on image data of the N rolled scrolls calculated in S604 are formed on the roll paper. Note that, in the case where the number N of rolled scrolls calculated in S604 is zero, no image formation is performed. Moreover, in the present step, information on a leading end position of a portion excluding the images of the scroll(s) for which image formation is completed from the whole of images to be printed is stored in the storage unit 25 as information on an image formation resuming position, for print resuming after the replacement of the roll paper.

In S606, the CPU of the control unit 24 displays a message such as, for example, "Remaining amount of roll paper is not enough. Please replace roll paper with new roll paper" on the display unit 26a as a warning message prompting the replacement of the roll paper. The user having read such a message replaces the currently-loaded roll paper with a new roll paper.

In S607, the CPU of the control unit 24 determines whether the printable length of the currently-loaded roll paper is equal to or larger than the roll length necessary for the printing of the remaining portion of the corresponding job. In the case where the result of the determination of the present step is true, the CPU proceeds to S608. Meanwhile, in the case where the result of the determination of the present step is false, the CPU proceeds to S604.

In S608, the CPU of the control unit 24 obtains the information on the image formation resuming position stored in S605. Then, the CPU of the control unit 24 executes the print process based on image data of the remaining portion of the corresponding job by using the obtained information in cooperation with the image forming unit 22.

For example, the work product as illustrated in part (c) of FIG. 8 can be obtained in the processes from S604 to S608.

Regarding Cutting Step

Figure 9:
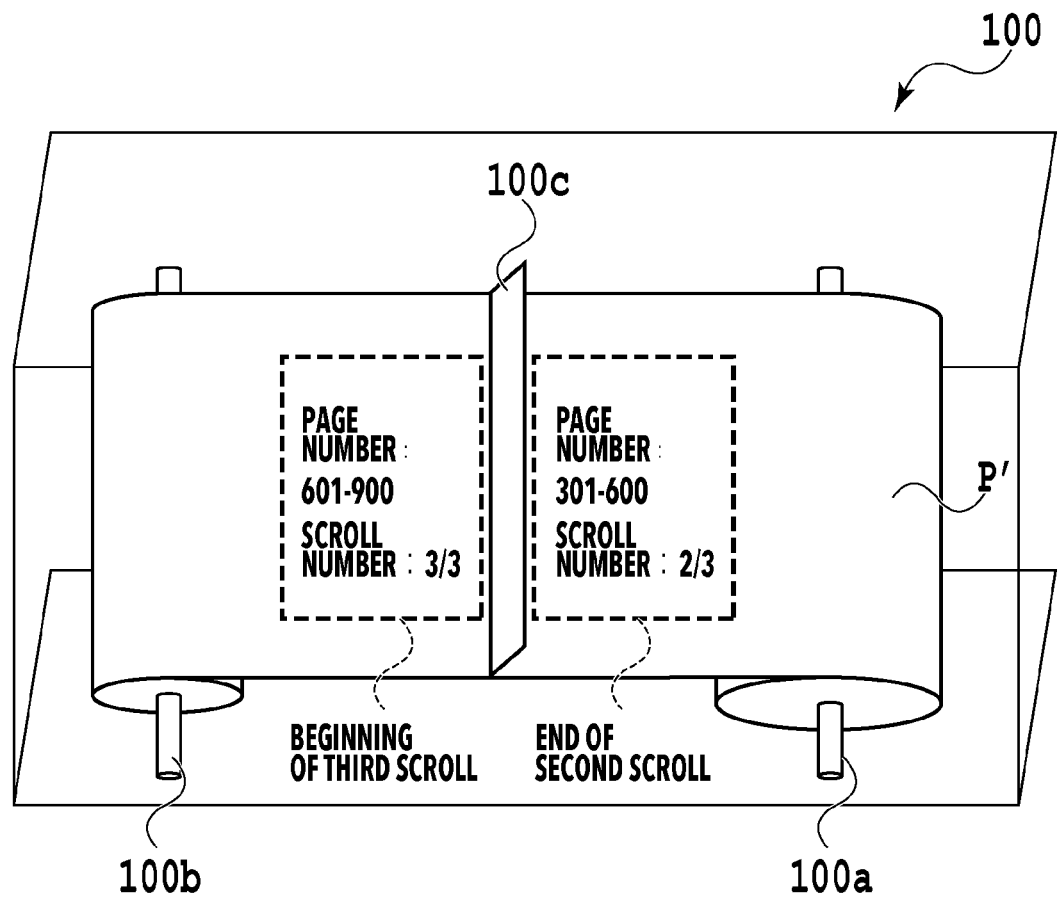
FIG. 9 is a diagram illustrating a configuration example of a cutting machine that cuts the work product into a delivery form.

Description is given of the case where, after the printing in the image forming system 1, the roll paper P is primarily wound by the winding apparatus 30, and is then set to a final delivery form by using a cutting machine 100 illustrated in FIG. 9. In this section, description is given by using the work product illustrated in part (b) of FIG. 8 and part (a) of FIG. 10 as an example.

The cutting machine 100 is an apparatus for cutting the roll paper (hereinafter, referred to as primary roll) primarily wound in the image forming system 1 to create the scrolls in the final delivery form. The cutting machine 100 includes a paper feeding unit 100a in which the primary roll is set and that feeds the set primary roll to a subsequent unit, a winding unit 100b that winds the fed primary roll, and a cutter 100c that cuts the fed primary roll.

Figure 10:
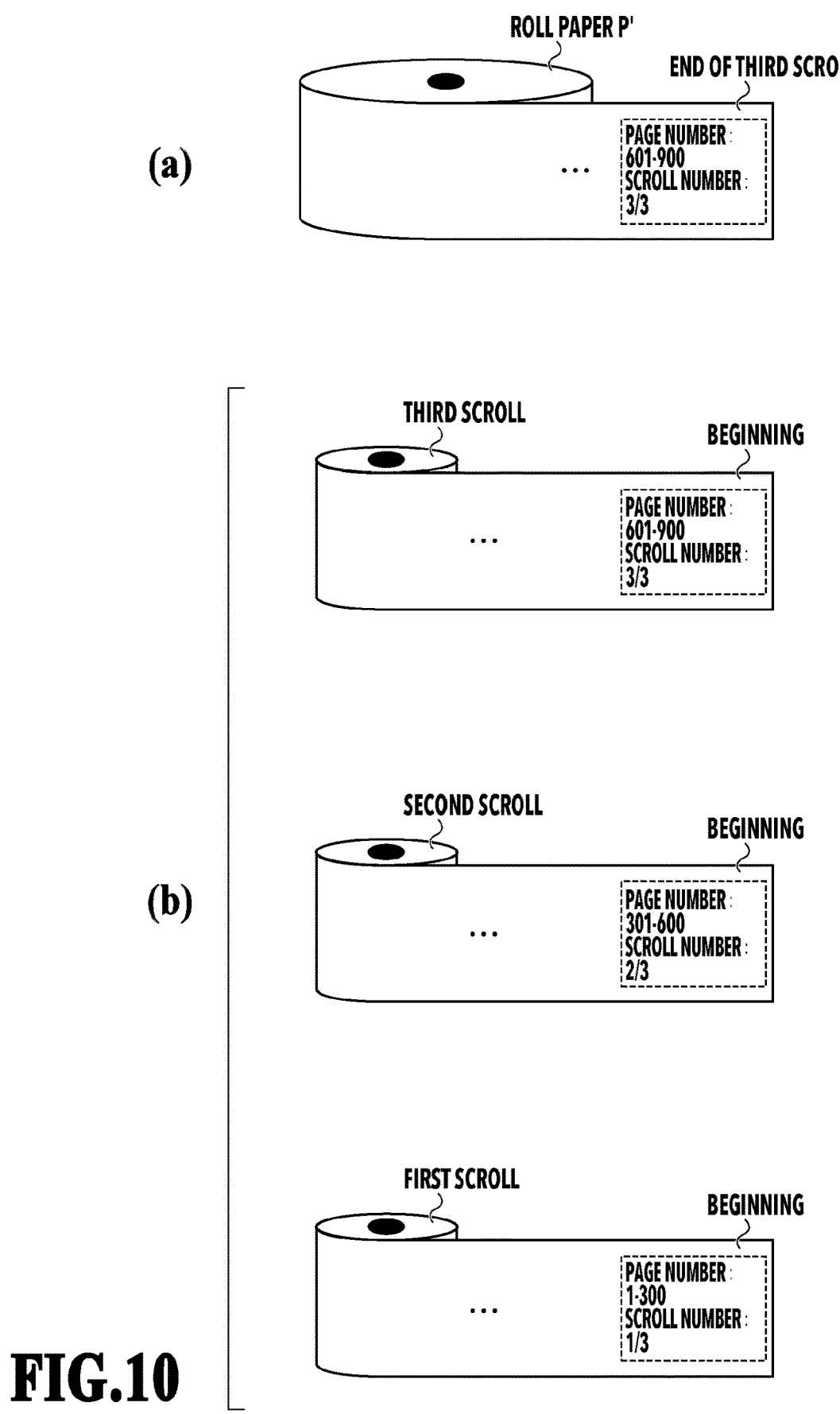
FIG. 10 is a diagram for explaining partition work in the present disclosure as an effect of the present disclosure.
Figure 12:
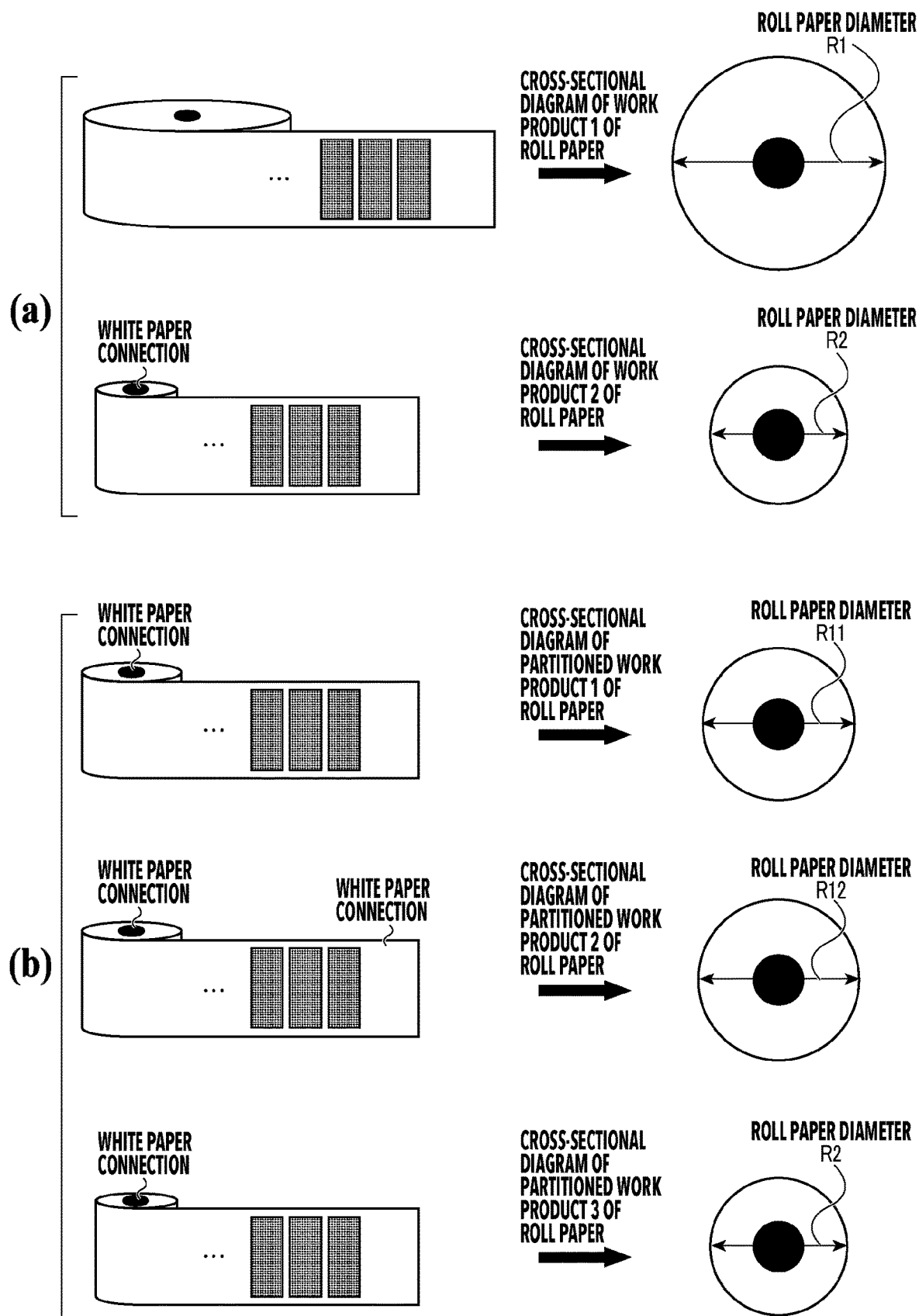
FIG. 12 is a diagram for explaining a problem that occurs in the conventional partition work.

The operator sets the work product P' illustrated in part (a) of FIG. 10 in the paper feeding unit 100a. Moreover, the operator views the partition information page at the end of the third scroll that is one end of the work product P' to grasp scroll length information on the third scroll to be cut. Next, the operator having grasped the scroll length information on the third scroll winds the work product P' by a length corresponding to the grasped roll length information with the winding unit 100b. Then, as illustrated in FIG. 9, the operator cuts the work product P' at a position between the beginning of the third scroll and the end of the second scroll by using the cutter 100c. A delivery product of the third scroll among the three scrolls illustrated in part (b) of FIG. 10 is thereby obtained. Note that a delivery product of the second scroll and a delivery product of the first scroll can be also obtained by performing similar work on the remaining work product P'.

Note that adding the partition information pages at the beginning and the end of each scroll as illustrated in FIG. 9 allows the operator to easily recognize a cutting position between scrolls such as the third scroll and the second scroll, and is thus preferable. Moreover, according to the present embodiment, work of connecting a white paper that may occur in conventional partition work does not occur. Accordingly, burden on the operator is assumed to be reduced.

Effects and Like of Present Embodiment

As described above, in the present embodiment, the partition information page is printed by being added to a portion visible in the state where the roll paper is wound. The operator can thereby easily grasp the final delivery form. Moreover, in the present embodiment, as many rolled scrolls in the delivery form as they can fit into the printable length of the currently-loaded roll paper are printed. The image set including the contents images and the page image can be thereby printed without interruption in the middle, and it is possible to suppress the case where work of partitioning to the final delivery form becomes complex for the operator.

Second Embodiment

A second embodiment is described below. The print control based on one print job is mainly described in the aforementioned first embodiment (see FIG. 6). Meanwhile, in the present embodiment, print control based on multiple print jobs is described in detail. Note that contents that are the same as those in the first embodiment are omitted below as appropriate, and different contents are mainly described. The configurations of the image forming system 1 and the image forming apparatus 20 in the present embodiment are the same as those in the first embodiment (see FIGS. 1 and 2).

Specifically, for example, the case of FIG. 3B is conceivable as the present embodiment. As described above, FIG. 3B is a diagram illustrating one pattern of the job list that is implemented by the control unit 24 and the display unit 26a and that is the GUI screen for print setting. Two jobs are selected in the display region 301 in FIG. 3B, and the processes illustrated in FIG. 5 are started in the case where the displayed item 304 is pressed in this state. In the case where the image forming process for the two jobs has proceeded, the output history in the display region 305 is updated as illustrated in FIG. 3D.

Regarding Image Forming Process Based on Multiple Jobs

Figure 7:
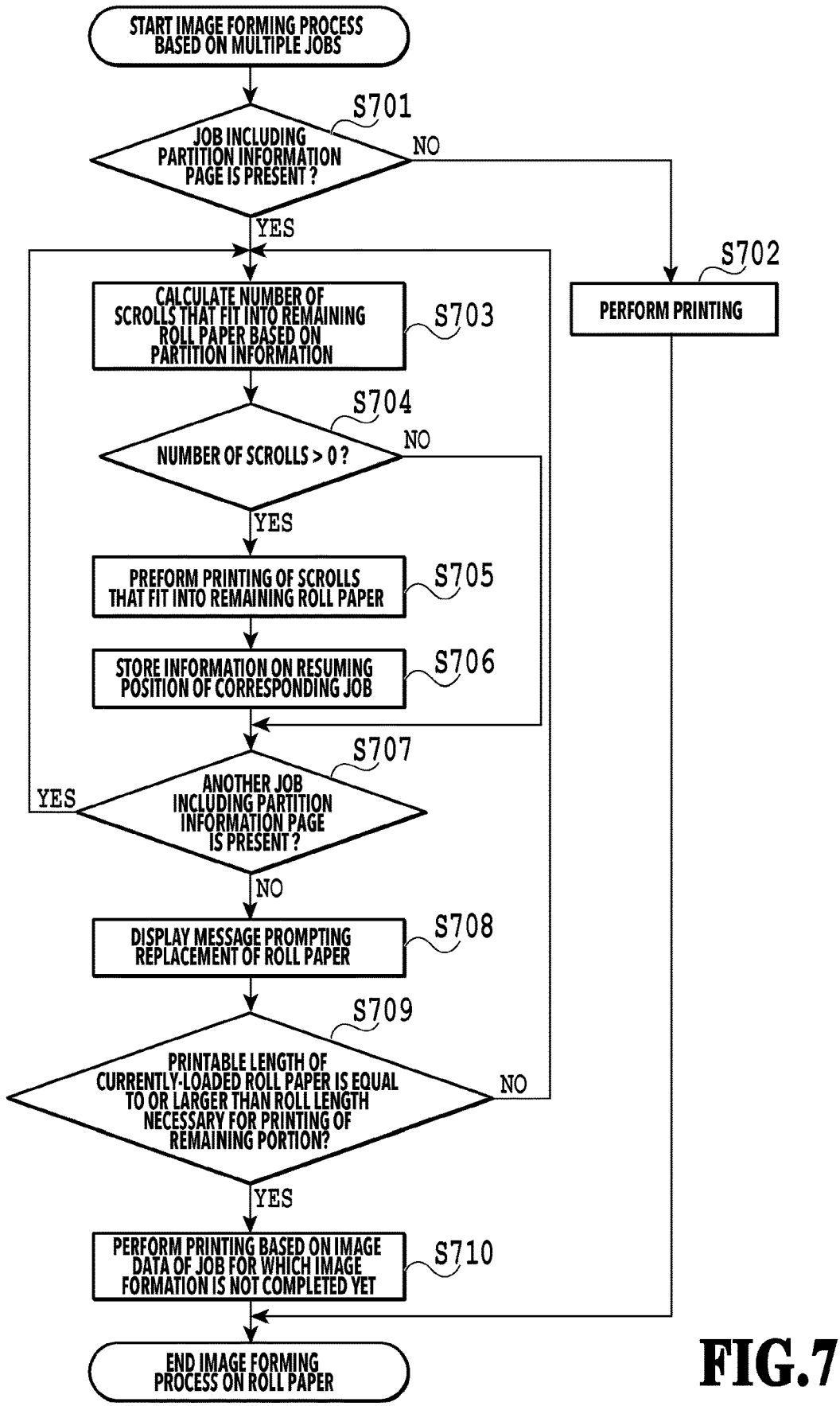
FIG. 7 is a flowchart of the image forming process based on multiple jobs in a second embodiment.

FIG. 7 is a flowchart of the image forming process based on multiple jobs that is executed in the case where the result of the determination is NO in S505 (see FIG. 5). The CPU of the control unit 24 executes processes of the respective steps in the series of processes illustrated in FIG. 7. Specifically, the CPU of the control unit 24 loads the system program stored in the storage unit 25 onto the RAM of the control unit 24, and executes the loaded system program to function as an execution entity that executes the processes of the respective steps.

In S701, the CPU of the control unit 24 determines whether the multiple jobs includes a job including the partition information page by using the setting information of "present/absent" indicating whether the partition information page is present or absent. In the case where the result of the determination of the present step is true, the CPU proceeds to S703. Meanwhile, in the case where the result of the determination of the present step is false, the CPU proceeds to S702.

In S702, the CPU of the control unit 24 executes the printing process of the multiple jobs by cooperating with the image forming unit 22. Specifically, the CPU forms images based on the image data of the jobs on the roll paper P in the order of selection in the display region 301. After S702, the series of processes is terminated.

In S703, the CPU of the control unit 24 calculates the number N of rolled scrolls in the delivery form that fit into the printable length of the currently-loaded roll paper, according to the formula (2). The present step is the same as S604 of the first embodiment (see FIG. 6). Note that, in the case where the CPU determines that there are the partition information pages for the multiple jobs in S701, the process of the present step is performed while one job closest to the head among the jobs for which the process of the present step is not executed is set as the corresponding job.

In S704, the CPU of the control unit 24 determines whether the number N of the scrolls calculated in S703 is larger than zero. In the case where the result of the determination of the present step is true (N>0), the CPU proceeds to S705. Meanwhile, in the case where the result of the determination of the present step is false (N≤0), the CPU proceeds to S707.

In S705, the CPU of the control unit 24 executes the print process of the corresponding job by cooperating with the image forming unit 22 as in S605 of the first embodiment (see FIG. 6). In the printing of each scroll in the present step, the printing is performed from the start page to the end page of each scroll included in the partition information, and the partition information page is added and printed in each of the start page and the end page. Moreover, in the present step, images based on image data of the N rolled scrolls calculated in S704 are formed on the roll paper.

In S706, the CPU of the control unit 24 stores information on a leading end position of a portion excluding the images of the scroll(s) for which image formation is completed from the whole of images to be printed in the corresponding job, for print resuming in a subsequent process (S710 or S705 after loop). This information is stored in the storage unit 25 as information on an image formation resuming position for each job.

In S707, the CPU of the control unit 24 determines whether the other jobs include a job that includes the partition information page. The "other jobs" are jobs for which the processes of S703 to S707 are not executed yet. In the present step, the CPU of the control unit 24 performs the determination by using the setting information of "present/absent" indicating whether the partition information page is present or absent. In the case where the result of the determination of the present step is true, the CPU proceeds to S703. Meanwhile, in the case where the result of the determination of the present step is false, the CPU proceeds to S708.

In S708, the CPU of the control unit 24 displays a message such as, for example, "Remaining amount of roll paper is not enough. Please replace roll paper with new roll paper" on the display unit 26a as a warning message prompting the replacement of the roll paper. The user having read such a message replaces the currently-loaded roll paper with a new roll paper.

In S709, the CPU of the control unit 24 determines whether the printable length of the currently-loaded roll paper is equal to or larger than the roll length necessary for the printing of the remaining portion of one or multiple jobs for which images are not formed yet. In the case where the result of the determination of the present step is true, the CPU proceeds to S710. Meanwhile, in the case where the result of the determination of the present step is false, the CPU proceeds to S703.

In S710, the CPU of the control unit 24 obtains the information on the image formation resuming position for each job stored in S706. Then, the CPU of the control unit 24 executes the image forming process on the roll paper P for the portion of one or multiple jobs for which images are not formed yet, by using the obtained information in cooperation with the image forming unit 22.

For example, the work product as illustrated in part (d) of FIG. 8 is obtained in the series of processes described above.

Specific Example of Work Product in Present Embodiment

Work products in the present embodiment are described by using part (d) of FIG. 8. With reference to part (d) of FIG. 8, on a roll paper before replacement, a first scroll and a second scroll are printed as work products of Document 1, and then a first scroll that is a work product of Document 2 is printed, instead of a third scroll of Document 1.

Moreover, on a roll paper after the replacement, the third scroll that is a work product of Document 1 is printed, next second to fourth scrolls that are work products of Document 2 are printed, and then a work product of Document 3 that includes no partition information page is printed.

Work products that involve no work of connecting white papers by the operator can be thus obtained.

Effects of Present Embodiment

According to the present embodiment, it is possible to obtain a work product that suppresses complication of the partition work of the operator also in the case where there are multiple jobs as jobs to be printed and replacement of the roll paper is necessary in the middle of printing.

Other Embodiments

Although the case where the partition information page is added and printed in each of the beginning and the end of the scroll is described in the aforementioned embodiments, the configuration of the added partition information page is not limited to that in the aforementioned embodiments. For example, in the case where multiple jobs are to be continuously printed, history information of the outputted jobs may be additionally printed in the partition information page every time the job for which images are to be formed changes.

Moreover, although the case where the partition information is generated with the number of print pages to be printed used as the condition is described in the aforementioned embodiments, the condition used to generate the partition information is not limited to the number of pages to be printed and may be any condition. The partition information may be generated by using, for example, the number of labels to be printed, the length of printing, or the like as the condition.

Moreover, the partition information page does not have to be necessarily added to both of the beginning and the end. The partition information page only needs to be added to at least one of the beginning and the end (that is, only at the beginning or the end).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to perform printing such that the partition work of the operator is reduced in the case where the printing is performed on the roll paper.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028265, filed Feb. 25, 2022, which is hereby incorporated by reference herein in its entirety.

What is claimed is:

1. A printing apparatus that prints images on a roll paper having a number of pages based on a job, the printing apparatus comprising:
   one or more memories that store instructions; and
   one or more processors configured to execute the instructions stored in the one or more memories to:
   perform control to print one or a plurality of image sets, each formed of a partition page image and a content image, on the roll paper based on a job, wherein the partition page image contains a value of the number of pages as partition information;
   wherein, in a case where the printing apparatus executes printing based on a first job that is a job in which the partition information is set, control is performed to determine, based on a remaining amount of the roll paper loaded on the printing apparatus, a first number that is a number of image sets that can be printed on the roll paper without interruption from among the image sets based on the first job to print the determined first number of image sets on the roll paper loaded on the printing apparatus,
   in a case where the first number of image sets are part of image sets among the image sets based on the first job, control is performed to determine a second number that is a number of image sets that can be printed on the roll paper after the first number of image sets are printed without interruption and is from among the image sets based on a second job that is a job in which the partition information is set and that is different from the first job to further print the determined second number of image sets on the roll paper loaded on the printing apparatus at a timing that is after the first number of image sets are printed and is before the roll paper loaded on the printing apparatus is replaced with a new roll paper, and
   after the first number of image sets and the second number of image sets are printed on the roll paper loaded on the printing apparatus, and the roll paper loaded on the printing apparatus is replaced with the new roll paper, control is performed to print, on the new roll paper, an image set that has not been printed yet among the image sets based on the first job and an image set that has not been printed yet among the image sets based on the second job.

2. The printing apparatus according to claim 1, wherein, in a case where the remaining amount of the roll paper is not enough upon execution of the printing based on the job in which the partition information is set, image formation is controlled.

3. The printing apparatus according to claim 1, wherein, in a case where the printing apparatus executes printing based on a job in which the partition information is not set, only the content image is formed.

4. The printing apparatus according to claim 1, wherein the instructions are further executed to generate image data of the partition page image based on the partition information settable for each of the jobs to insert the partition page.

5. The printing apparatus according to claim 4, wherein a value of a page number and a value of a scroll number for each of the image sets are printed in the partition page.

6. The printing apparatus according to claim 4, wherein the partition page image includes a first partition page image that is a beginning of the image set and a second partition page image that is an end of the image set, the image set includes the first partition page image, the content image subsequent to the first partition page image, and the second partition page image subsequent to the content image.

7. The printing apparatus according to claim 4, wherein the instructions are further executed to, in a case where the remaining amount of the roll paper is not enough upon execution of the printing based on the job in which the partition information is set, form as many image sets as the number of image sets that fit into the remaining amount.

8. The printing apparatus according to claim 7, wherein the instructions are further executed to calculate the number of image sets that fit into the remaining amount based on the remaining amount and a length necessary to print one image set.

9. The printing apparatus according to claim 4, wherein, in a case where a plurality of image sets based on one job in which the partition information is set are formed, the plurality of image sets have the same length.

10. The printing apparatus according to claim 1, further comprising:
a display that displays information to a user; and
an operation controller that is operated by the user.

11. The printing apparatus according to claim 10, wherein a job list that is a first GUI screen used by the user to select a job for which printing is to be executed is displayed by the display.

12. The printing apparatus according to claim 10, wherein a partition information setting screen that is a second GUI screen used by the user to set the partition information is displayed by the display.

13. The printing apparatus according to claim 12, wherein the partition information setting screen includes:
an input field of a numerical value that is used to set a length of a partition region;
a text box that is used to specify a start page and an end page of each of the image sets; and
a region that displays a preview.

14. The printing apparatus according to claim 1, wherein, from among the image sets based on the job, an image set having a length equal to or smaller than a printable length of the roll paper loaded on the printing apparatus is preferentially printed.

15. A control method of a printing apparatus that prints images on a roll paper having a number of pages based on a job, the control method comprising:
printing one or a plurality of image sets, each formed of a partition page image and a content image, on the roll paper based on a job, wherein the partition page image contains a value of the number of pages as partition information;
wherein, in a case where the printing is executed based on a first job that is a job in which the partition information is set, determining, based on a remaining amount of the roll paper loaded on the printing apparatus, a first number that is a number of image sets that can be printed on the roll paper without interruption from among the image sets based on the first job to print the determined first number of image sets on the roll paper loaded on the printing apparatus,
in a case where the first number of image sets are part of image sets among the image sets based on the first job, determining a second number that is a number of image sets that can be printed on the roll paper after the first number of image sets are printed without interruption and is from among the image sets based on a second job that is a job in which the partition information is set and that is different from the first job and further printing the determined second number of image sets on the roll paper loaded on the printing apparatus at a timing that is after the first number of image sets are printed and is before the roll paper loaded on the printing apparatus is replaced with a new roll paper, and
after the first number of image sets and the second number of image sets are printed on the roll paper loaded on the printing apparatus, and the roll paper loaded on the printing apparatus is replaced with the new roll paper, printing, on the new roll paper, an image set that has not been printed yet among the image sets based on the first job and an image set that has not been printed yet among the image sets based on the second job.

16. A non-transitory computer readable storage medium storing a program causing a printing apparatus that prints images on a roll paper having a number of pages based on a job to:
print one or a plurality of image sets, each formed of a partition page image and a content image, on the roll paper based on a job, wherein the partition page image contains a value of the number of pages as partition information;
wherein, in a case where the printing apparatus executes printing based on a first job that is a job in which the partition information is set, determine, based on a remaining amount of the roll paper loaded on the printing apparatus, a first number that is a number of image sets that can be printed on the roll paper without interruption from among the image sets based on the first job to print the determined first number of image sets on the roll paper loaded on the printing apparatus,
in a case where the first number of image sets are part of image sets among the image sets based on the first job, determine a second number that is a number of image sets that can be printed on the roll paper after the first number of image sets are printed without interruption and is from among the image sets based on a second job that is a job in which the partition information is set and that is different from the first job and to further print the determined second number of image sets on the roll paper loaded on the printing apparatus at a timing that is after the first number of image sets are printed and is before the roll paper loaded on the printing apparatus is replaced with a new roll paper, and
after the first number of image sets and the second number of image sets are printed on the roll paper loaded on the printing apparatus, and the roll paper loaded on the printing apparatus is replaced with the new roll paper, print, on the new roll paper, an image set that has not been printed yet among the image sets based on the first job and an image set that has not been printed yet among the image sets based on the second job.

17. The printing apparatus according to claim 1, wherein a job ticket including print setting information and information on a number of scrolls to be delivered is received to generate and print the image sets based on the job ticket.

18. The printing apparatus according to claim 1, wherein the instructions are further executed to calculate a number of rolled scrolls in delivery form that fit into a printable length of a currently-loaded roll paper.

19. The printing apparatus according to claim 1, wherein a job in which a roll length necessary for printing is equal to or smaller than a printable length of a currently-loaded roll paper is preferentially printed.

* * * * *